United States Patent [19]

Kinumoto et al.

[11] 4,397,890
[45] Aug. 9, 1983

[54] METHOD OF LINING PIPES
[75] Inventors: Namio Kinumoto, Osaka; Takashi Nakao, Katano; Hiroshi Murase, Sakai, all of Japan
[73] Assignee: Osaka Gas Company, Limited, Osaka, Japan
[21] Appl. No.: 343,982
[22] Filed: Jan. 29, 1982
[51] Int. Cl.³ .......................... B05D 7/22; B05D 1/42
[52] U.S. Cl. ..................................... 427/230; 427/235; 427/238; 427/239
[58] Field of Search ................ 427/230, 239, 235, 238
[56] References Cited
U.S. PATENT DOCUMENTS
3,041,204  6/1962  Green ............................ 118/105 X
3,237,594  3/1966  Weaver et al. .................. 118/105 X Primary Examiner—James R. Hoffman
Attorney, Agent, or Firm—Cushman, Darby & Cushman

[57] ABSTRACT

A method of lining a large pipe and small pipes branching therefrom with a seal composition, in which the pipes are lined as connected together, and the large pipe or the small pipes are lined first. The portion of the seal composition forced into the small pipes when the large pipe is lined with use of a running body is returned into the large pipe again and is subsequently applied, without being discharged from the system, to the lining layer of the large pipe as a top coat with use of a running body having a slightly smaller diameter than the running body. When one of the pipes has a greatly bent portion, a running body is used which comprises two members each shaped symmetrically, congruent with each other and interconnected by a flexible linear member.

9 Claims, 11 Drawing Figures

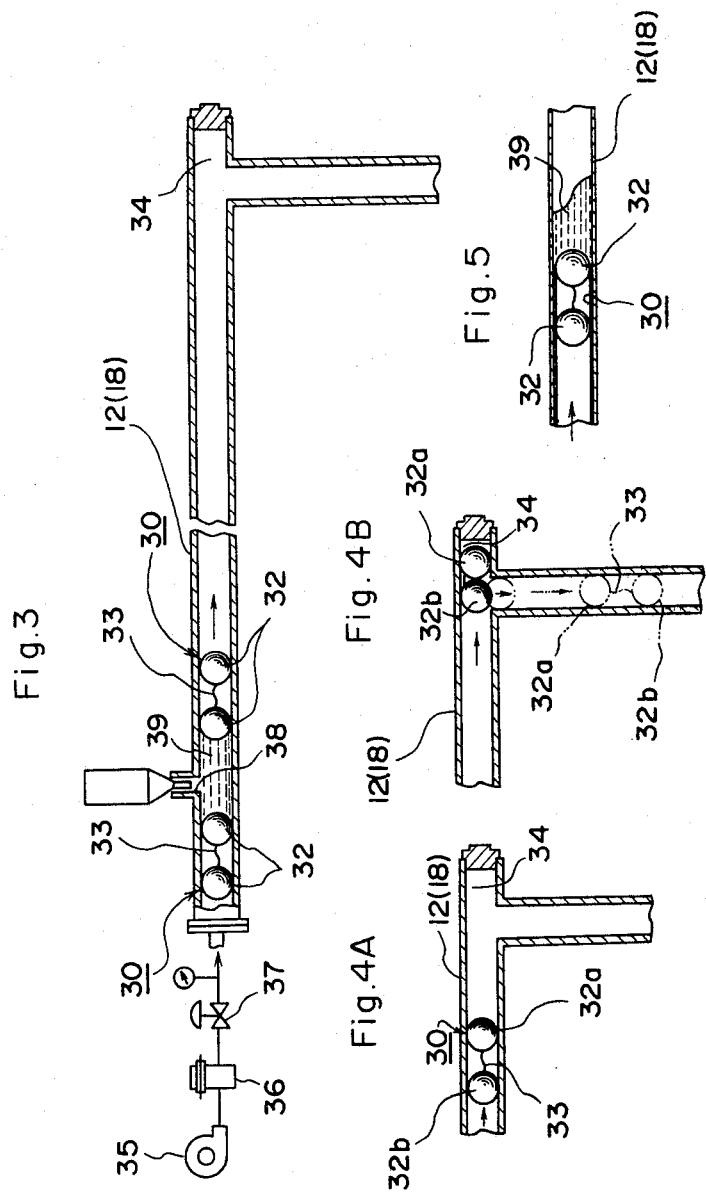

METHOD OF LINING PIPES

BACKGROUND OF THE INVENTION

1. Field of the Invention

The present invention relates to a method of lining pipes for supplying gases, water, etc., especially pipes having branches.

2. Description of the Prior Art

Piping systems comprising a large-diameter pipe (hereinafter referred to as "large pipe") and a small-diameter pipe (hereinafter referred to as "small pipe") are lined usually after the pipes are separated by cutting at the branch point to line them individually. This method requires much labor for the separation and for rejoining the lined pipes and is very inefficient. In view of this, a method has recently been proposed by which the large pipe and the small pipe can be lined efficiently as joined together without separation.

This method comprises the step of lining a small pipe by causing a small-diameter running body corresponding thereto to run through the pipe, and the step of lining a large pipe by causing a large-diameter running body corresponding thereto to run through the pipe, one of the two steps being performed before the other. However, since the lining or seal composition is partly forced into the small pipe during the large pipe lining step, the method has the problem that the excess of the seal composition must be pushed back and thereafter discharged from the large pipe.

In the case where this method is practiced for a piping including a large number of small pipes as branches, the excesses of the seal composition pushed back or returned will amount to a considerable quantity when combined. Economically it is very disadvantageous to discharge and discard the whole quantity in view of the waste of the composition and the procedure needed for the disposal. Moreover, the seal composition returned from the small pipe at an upstream location is likely to flow into another small pipe at a downstream location. To avoid this problem, there is the need to limit the length of lining which can be formed by a single pass, or the return and discharge of the excess must be repeated. Such an attempt nevertheless inherently imposes a limitation on the improvement of efficiency.

SUMMARY OF THE INVENTION

An object of the present invention, which has been accomplished to overcome the foregoing problems heretofore encountered, is to provide a method of lining a piping with its branch pipes joined together characterized in that the portion of a seal composition returned from a small pipe as described above is positively utilized for consumption without being discharged as an excess.

Another object of the invention is to provide a method of lining a piping including a large pipe and a small pipe with a seal composition which method is characterized by positively utilizing such a returned portion of the seal composition and also by using a special running body which is capable of smoothly lining the piping with the seal composition even when an L-shaped or T-shaped greatly bent portion is included in the large pipe and/or the small pipe.

According to the method of this invention, a running body having a slightly smaller diameter than the running body previously used for lining a large pipe is caused to run through the large pipe after a seal composition returning step, whereby the returned seal composition is consumed for coating the lining of the large pipe on the downstream side of the location of return of the composition.

Thus, the returned seal composition is positively consumed for lining the large pipe with the present method. This eliminates or greatly reduces the waste involved in the conventional method wherein such a returned composition is discarged from the large pipe. The composition discharging procedure can therefore be eliminated or simplified, consequently rendering the present method efficient and economical to practice.

The returned seal composition is consumed wholly or almost wholly while it is being pushed forward from the branch portion where it is returned before reaching the next branch portion. Accordingly the composition is completely prevented from entering the next small pipe. Thus there is no limitation on the length of lining that can be formed by a single pass. In fact, even an elongated piping system can be lined by a continuous operation with a remarkably improved efficiency without the necessity of separating small pipes from a large pipe.

The above-mentioned special running body to be used for pipes having an L- or T-shaped bend comprises a plurality of, preferably two, members which are connected to each other. More specifically the running body comprises members each of which is symmetrical with respect to a plane perpendicular to the direction of its movement for performing lining or like work within the pipe and which are congruent or approximately congruent with one another and interconnected by a flexible linear member.

Other objects and advantages of the present invention will become apparent from the following description of embodiments given with reference to the accompanying drawings.

BRIEF DESCRIPTION OF THE DRAWINGS

FIG. 3 is a sectional view partly broken away and schematically showing another embodiment;

FIGS. 4A and 4B are sectional views showing how a running body moves forward; and FIG. 5 is a fragmentary sectional view showing a modification of FIG. 3.

DESCRIPTION OF THE PREFERRED EMBODIMENTS

Figure 1A:
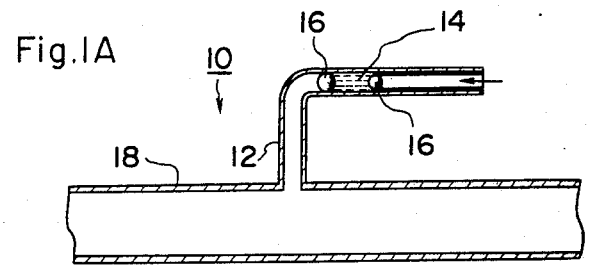
FIGS. 1A to 1D are diagrams showing a sequence of steps of operation according to a first embodiment.
Figure 1B:
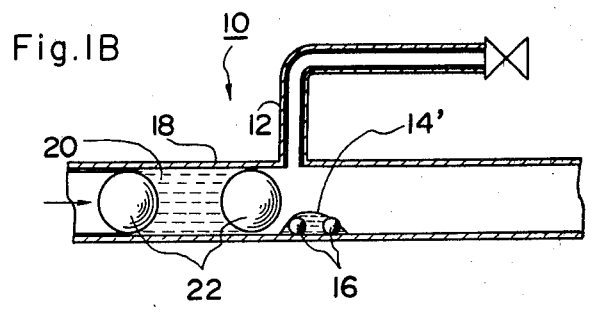
Figure 1C:
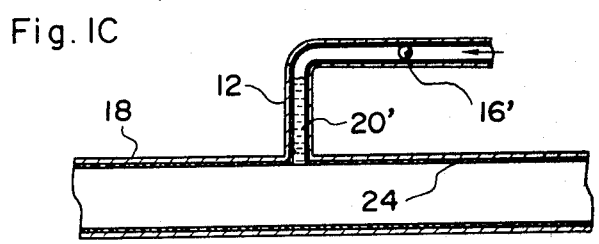
Figure 1D:
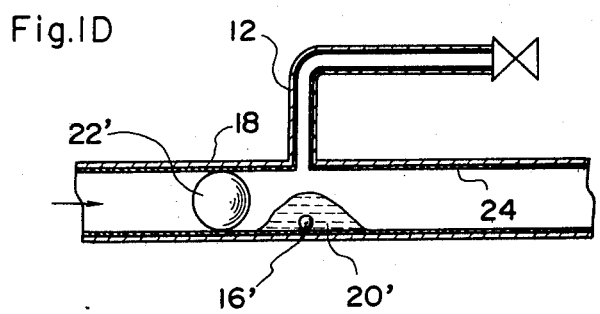
Figure 2A:
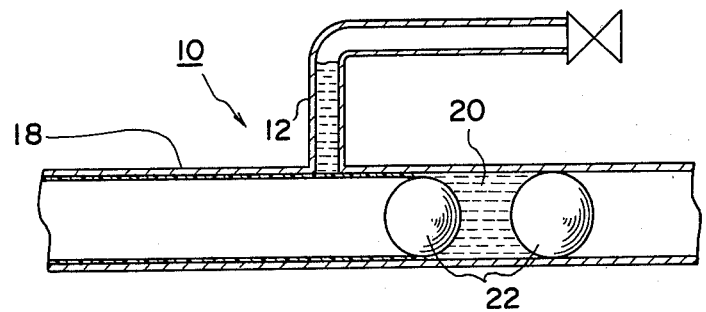
FIGS. 2A to 2C are diagrams showing a sequence of steps of operation according to a second embodiment.
Figure 2B:
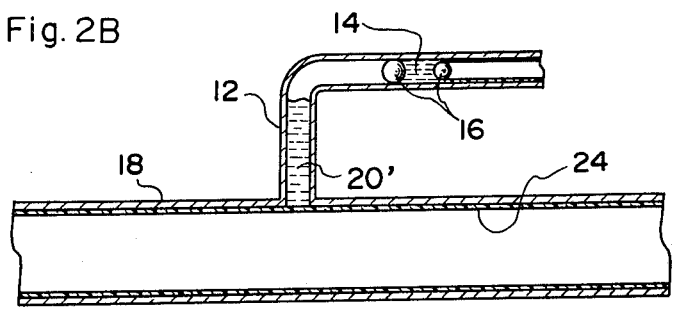
Figure 2C:
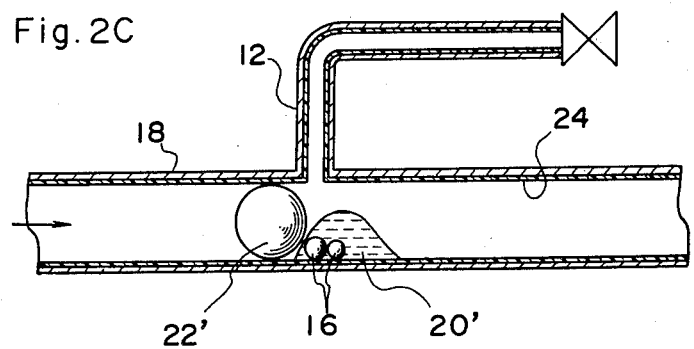

FIGS. 1A to 1D show a case wherein the step of lining a small pipe precedes the step of lining a large pipe, and FIGS. 2A to 2C a reverse case.

First, the operation illustrated in FIGS. 1A to 1D will be described.

I. A fluid seal composition 14 and a pair of diametrically small running bodies 16, 16 for holding the composition therebetween are placed into a small pipe 12 of a piping 10 as seen in FIG. 1A. A back pressure is applied to the bodies to cause them to run through the pipe 12 and line the pipe with the composition in the form of a tubular layer.

II. A portion 20 of the same fluid seal composition as above and a pair of diametrically large running bodies 22, 22 for holding the composition therebetween are placed into a large pipe 18 of the piping 10 as shown in FIG. 1B. A back pressure is applied to the bodies 22, 22 to cause them to run through the pipe 18 and line the pipe with the composition in the form of a tubular layer. At this time, the small running bodies 16,16 and the portion 14' of the seal composition which have been forced into the large pipe 18 by the step I are sent forward at the same time. The portion 14' is used for lining the large pipe 18. The running bodies 16, 16 are discharged from the pipe 18.

The rear running bodies 16, 22 used for the steps I, II have radii samller than the radii of the corresponding pipes by the thickness of the lining layers respectively.

III. The portion 20' of the seal composition forced into the small pipe 12 by the step II is pushed back into the large pipe 18 merely by introducing a fluid into the small pipe 12 from its open end, or by causing a diametrically small running body 16' to run through the pipe 12 as shown in FIG. 1C. The latter method is preferable to render the lining uniform in thickness.

IV. The portion 20' of the seal composition pushed back by the step III is moved through the large pipe 18 downstream by causing a diametrically large running body 22' to run therethrough as seen in FIG. 1D. The running body 22' has a slightly smaller diameter than the large running bodies 22 used for lining the large pipe 18 in the step II. Consequently the pushed back or returned portion 20' of the composition is consumed for coating the lining layer 24 formed by the step II.

Next, the operation shown in FIGS. 2A to 2C will be described.

Ia. The diametrically large running bodies 22, 22 are caused to run through the large pipe 18 to line the pipe with a portion 20 of the seal composition as shown in FIG. 2A.

IIa. The diametrically small running bodies 16, 16 are caused to run through the small pipe 12 to line the pipe 12 with a portion 14 of the seal composition as seen in FIG. 2B. The portion 20' of the seal composition forced into the small pipe 12 by the step Ia is pushed back into the large pipe 18 simultaneously with the completion of this step.

IIIa. The diametrically large running body 22' which is slightly smaller than the body 22 as stated above is caused to run through the large pipe 18 to discharge the small running bodies 16, 16 as shown in FIG. 2C. At this time, the pushed back or returned portion 20' of the seal composition in the step IIa is consumed for coating the lining layer 24 formed by the step Ia.

The running body 22' used for consuming the returned seal composition in the cases shown in FIGS. 1A to 1D and FIGS. 2A to 2C, when in a free state, has a slightly smaller diameter than the large running body 22 for lining. Thus a rigid body of metal, hard resin or the like is usable as the body 22. Alternatively a running body is usable which is variable in its volume or shape in accordance with variations in the running back pressure and which is thereby adapted to have a slightly smaller diameter than the lining body 22.

While the present method has been described above for lining the piping 10 having one small pipe 12, the method is practiced in the following manner for piping systems having a multiplicity of small pipes.

The small pipe lining step I or IIa or the composition returning step III is performed for all small pipes 12 concurrently as a group or for one small pipe after another in succenssion. The large pipe lining step II or Ia or the returned composition consuming step IIIc is performed over the entire length of the large pipe 18 at a time.

However, the piping system may be divided into sections each including one small pipe 12 or a suitable number of small pipes 12 to perform the steps I to IV or steps Ia to IIIa for each section.

FIG. 3 shows an embodiment useful for piping systems including greatly bent portions, such as L-shaped, T-shaped or other bends, in large pipes and/or small pipes. The drawing shows a large or small pipe only partly, which can be lined by the same procedures as already described for large and small pipes with reference to FIGS. 1A to 1D or FIGS. 2A to 2C.

More specifically with reference to FIG. 3, a pipe 12 or 18 has opposite open ends for working. Running bodies 30 are placed in the pipe at one open end. The pneumatic pressure produced by a blower 35 and supplied via a pressure adjusting device 36 and a stop valve 37 is applied to the running bodies to cause them to move through the pipe toward the other open end thereof. The running body 30 comprises two members 32, 32 each of which is symmetrical with respect to a plane perpendicular to the direction of its movement and which are congruent or approximately congruent with each other. Such members are, for example, spherical, regular hexagonal, elliptical, oval or irregular hexagonal. These members 32, 32 are interconnected by a flexible linear member 33, such as a string of fabric, wire, spring or plastics cord.

The running body 30 useful for the method of this invention passes through a T-shaped plugged bend in the following manner. Of the two members 32a, 32b moving forward in the front-to-rear relation shown in FIG. 4A, the preceding member 32a first enters a plugged space 34 and comes to a halt at or near the inlet of the space to close the space. Since the T-shaped bend is approximately L-shaped, the following member 32b consequently comes into contact with the preceding member 32a at a stop and moves forward into a downstream pipe section as seen in FIG. 4B. Subsequently the member 32b pulls the member 32a at a stop through the linear member 33, with the result that the two members pass through the bend in a reversed front-to-rear relation indicated in phantom lines in FIG. 4B. Since the two members 32a, 32b are congruent or approximately congruent with each other and are each symmetrical with respect to a plane perpendicular to the direction of its movement, the reversed front-to-rear relation produces hardly any adverse effect on the subsequent movement of the body per se and work within the pipe.

The two running bodies 30 are placed in the pipe 12 or 18 as spaced apart by a suitable distance. Through a bore 38 formed in the pipe close to the above-mentioned one open end, a seal composition 39 of relatively low viscosity is injected into the space between the two bodies. The blower 35 is then operated to cause a pneumatic pressure to move the bodies 30, 30 along the inner surface of the pipe, whereby the pipe is lined with the seal composition in the form of a continuous tube.

Whereas the conventional running body which comprises a single member instead of the two interconnected members of the invention blocks pipes at bent portions and even at branch portions, the running body of the invention is thus reliably and smoothly movable through such portions. Accordingly piping of the desired length including bent portions can be lined continuously and efficiently by a single pass of the running body of the invention. In other words, the use of the running body renders the working method of this type feasible for much wider application in respect of the conditions involved, such as the configuration of piping. Moreover the running body is easy to handle for actual work since the constituent members are shaped symmetrically as described above and can therefore be inserted into the pipe in any front-to-rear relation.

Most preferably, the running body is made of an elastic material. The flexible linear member has such a length that the face-to-face distance between the two running members is about ½ of the diameter of the pipe to be worked on. It is suitable to use a natural or synthetic rubber, especially foam rubber, as the elastic material, because when the two members made of such material are subjected to a back pressure of about 1 to 1.2 kg/cm² G and to the pressure of air confined between the members, these members are stretched radially of the pipe and brought into intimate contact with the inner surface of the pipe. Another reason is that such members run smoothly and are unlikely to locally reduce the thickness of the lining layer beneath the members under gravity. It is preferable to use a stainless steel wire rope as a linear member which has suitable flexibility and strength. Advantageously the rope has a diameter of 1.6 mm for use with 2- to 3-inch pipes or about 1 mm for 1- to 1½-inch pipes. If the face-to-face distance between the two members is exceedingly larger than ½ of the diameter of the pipe to be worked on, e.g. equal to the diameter, or is extremely smaller than the diameter, the members will not turn smoothly at L-shaped or T-shaped bends. We have found that the best result can be achieved when the flexible linear member has the above-mentioned length (i.e. face-to-face distance) and suitable bending rigidity.

Although FIG. 3 shows two running bodies 30, 30 for holding the seal composition 39 therebetween since the composition has a relatively low viscosity, only one running body 30 is of course usable for pushing the seal composition forward as seen in FIG. 5 when the composition has a relatively high viscosity and the running body is caused to run at a relatively high speed.

What is claimed is:

1. A method of lining a piping having branched pipes by causing a body to run through the piping (10) including a large pipe (18) and a small pipe (12) branching therefrom and thereby lining the piping with a fluid seal composition in the form of a tube, the method being characterized by the steps of lining the small pipe (12) by causing a diametrically small running body (16) corresponding thereto to run through the pipe (12), lining the large pipe (18) by causing a diametrically large running body (22) corresponding thereto to run through the pipe (18) and form a lining layer (24), one of the lining steps being performed before the other, returning into the large pipe (18) the portion (20') of the seal composition forced into the small pipe (12) during the large pipe lining step, and consuming the returned portion (20') of the composition for coating the lining layer (24) on the downstream side of the location of the return by causing a running body (22') retaining a slightly smaller diameter than the large running body (22) to run through the large pipe (18) after the returning step.

2. A method as defined in claim 1 wherein the running body (22') for consuming the returned portion of the seal composition has the slightly smaller diameter in a free state.

3. A method as defined in claim 1 wherein the running body (22') for consuming the returned portion of the seal composition is deformable to the slightly smaller diameter by adjusting the back pressure used for running.

4. A method as defined in any one of claims 1 to 3 wherein the small pipe lining step precedes the large pipe lining step, and the seal composition returning step is performed separately after the large pipe lining step.

5. A method as defined in any one of claims 1 to 3 wherein the large pipe lining step procedes the small pipe lining step, and the seal composition returning step is performed simultaneously with the completion of the small pipe lining step.

6. A method as defined in any one of claims 1 to 3 wherein a fluid pressure is applied to the back side of the running body (30) as placed in the piping (10) to thereby move the body toward the direction of flow through the piping and cause the body to apply the seal composition to the piping, the running body 30 comprising a plurality of members (32) each symmetrical with respect to a plane perpendicular to the direction of its movement and congruent or approximately congruent with one another, the members (32) being interconnected by a flexible linear member (33).

7. A method as defined in claim 6 wherein the running body (30) comprises spherical members (32).

8. A method as defined in claim 6 wherein the members (32) of the running body (30) are made of an elastic material.

9. A method as defined in claim 8 wherein the members (32) of the running body (30) are made of urethane foam.

* * * * *